United States Patent [19]

Smirl

[11] Patent Number: 4,526,559
[45] Date of Patent: Jul. 2, 1985

[54] TENSION-TYPE BELT/PULLEY SYSTEM FOR A CONTINUOUSLY VARIABLE TRANSMISSION

[75] Inventor: Richard L. Smirl, Arlington Heights, Ill.

[73] Assignee: Borg-Warner Corporation, Chicago, Ill.

[21] Appl. No.: 579,923

[22] Filed: Feb. 14, 1984

Related U.S. Application Data

[63] Continuation of Ser. No. 247,490, Mar. 25, 1981, abandoned.

[51] Int. Cl.³ ............................................. F16G 1/00
[52] U.S. Cl. ..................................... 474/201; 474/242
[58] Field of Search ....................... 474/201, 242, 244

[56] References Cited

U.S. PATENT DOCUMENTS

| 135,409 | 2/1873 | Colton | 474/242 |
| 642,549 | 1/1900 | Kennedy | 474/242 |
| 4,080,841 | 3/1978 | Vollers | 474/242 |
| 4,152,947 | 5/1979 | Deursen et al. | 474/28 X |
| 4,241,618 | 12/1980 | Smirl | 474/46 X |

FOREIGN PATENT DOCUMENTS 1351507 12/1962 France .................................. 474/13

Primary Examiner—James A. Leppink
Assistant Examiner—Frank H. McKenzie, Jr.
Attorney, Agent, or Firm—Julian Schachner

[57] ABSTRACT

A tension-type belt/pulley system provides an improved concept for retaining the bands of the drive belt within the pulley cones while increasing the maximum operating pitch radius of the belt for a given pulley radius, thereby increasing the ratio range of the system. The pulley flanges are chamfered at their outer ends to provide smooth re-entry of the bands into the cones in the event the bands drift laterally during a half revolution of the belt.

7 Claims, 3 Drawing Figures

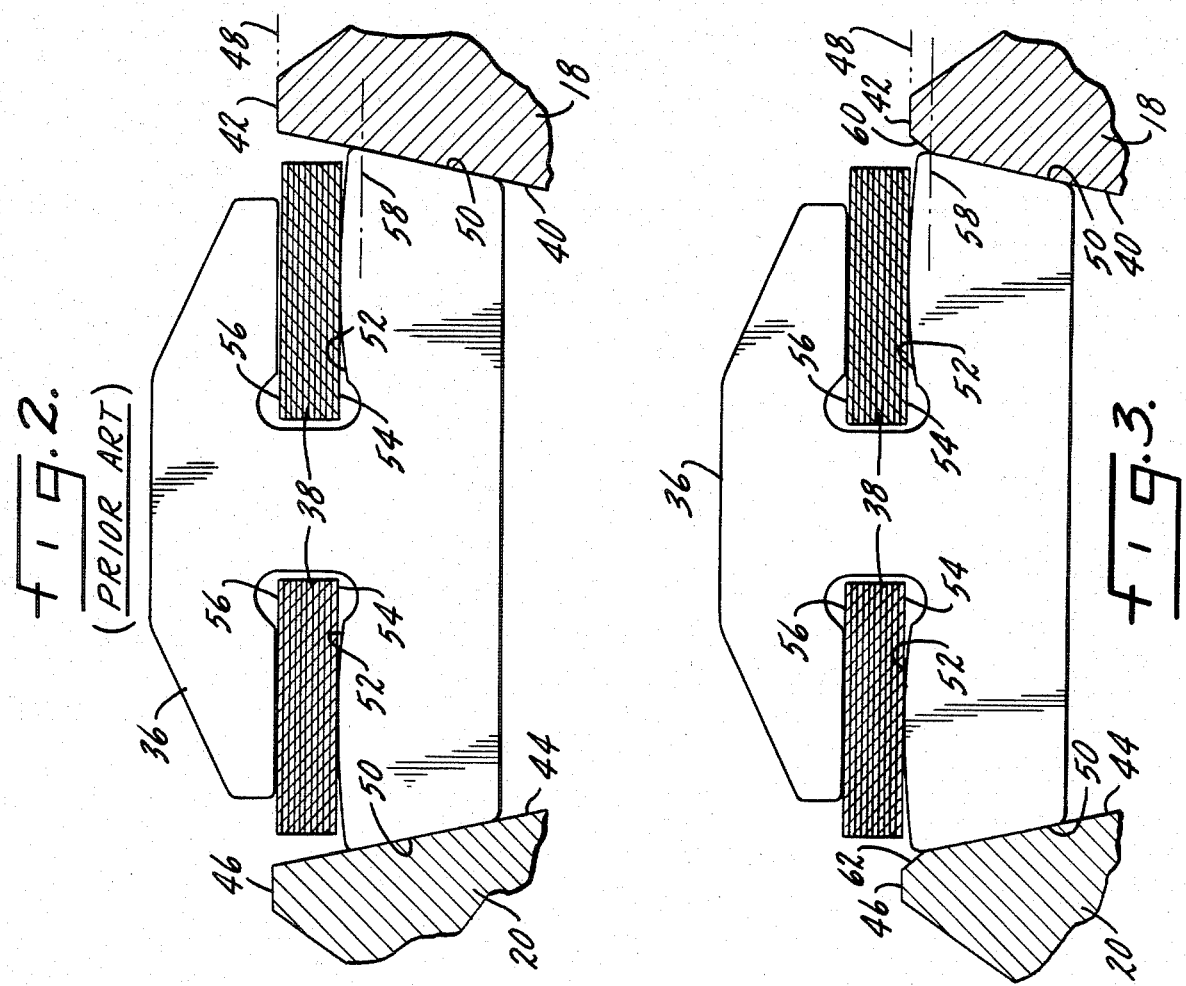
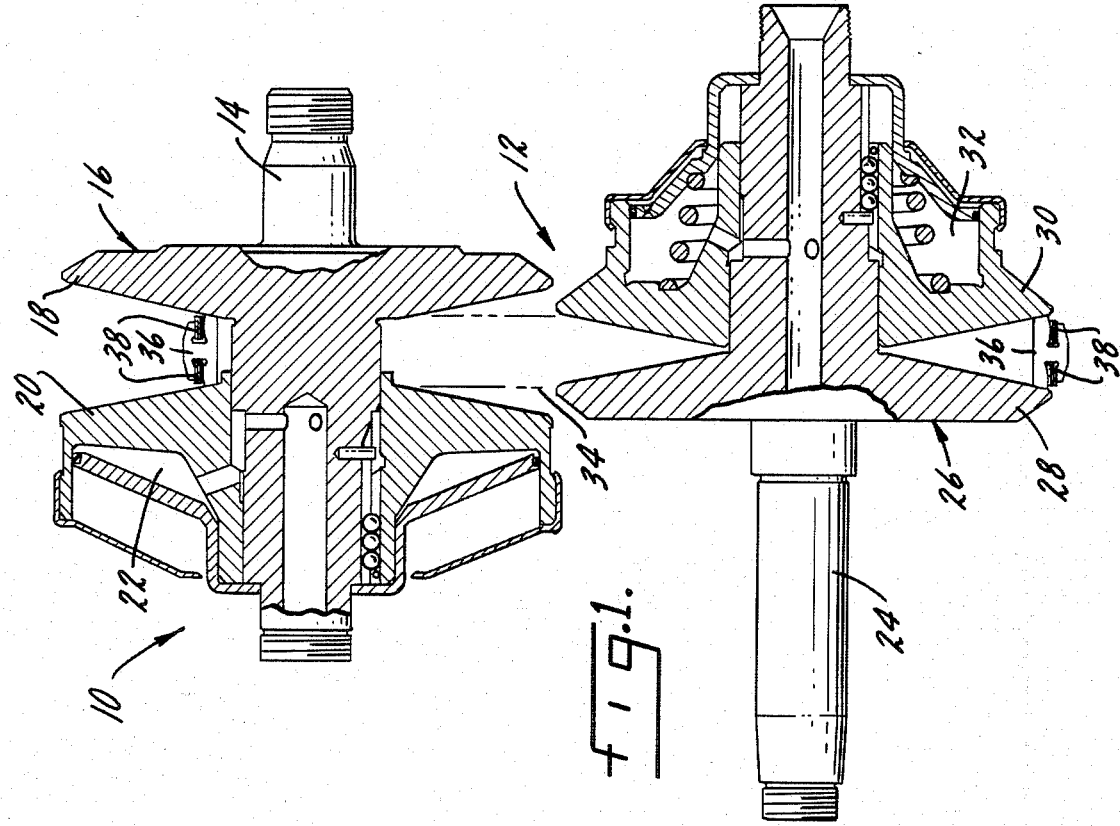

4,526,559

TENSION-TYPE BELT/PULLEY SYSTEM FOR A CONTINUOUSLY VARIABLE TRANSMISSION

This is a continuation, of application Ser. No. 247,490 filed Mar. 25, 1981 now abandoned.

BACKGROUND OF THE INVENTION

This invention relates generally to a continuously variable transmission (CVT) in which spaced pulleys are coupled by a tension-type belt. More particularly, it relates to an improved belt/pulley system which provides an increased ratio range resulting from an increase in the maximum operating pitch radius of the belt for a given maximum pulley cone radius.

The typical automotive transmission is shifted in finite steps between a high-torque, low-speed mode for starting a vehicle and a high-speed, low-torque mode for vehicle operation at highway speeds. In a manual transmission, shifting is accomplished by the selection and engagement of gear sets. In an automatic transmission, shifting is accomplished by the controlled engagement and release of friction elements. Because such shifting is in step functions, the most efficient vehicle operation can only be approximated. Efficiency would be improved by the provision of a transmission in which the drive ratio could be varied in a regular, continuous manner as the vehicle is started and accelerated to highway speeds.

It is known to use a CVT employing variable pulleys in machine tools and the like. Recently, considerable work has been directed to the application of a CVT to the drive train of an automotive vehicle. Examples of such CVT's are disclosed in U.S. Pat. No. 4,152,947 issued May 8, 1979 and U.S. Pat. No. 4,241,618 issued Dec. 30, 1980. These patents are incorporated herein by reference.

A CVT of this type may employ a tension-type belt which includes a plurality of struts guided by one or more endless bands. The struts transmit torque by compression. The bands guide the struts, and act in tension to retain the belt in its operating configuration. Examples of belts of this type are disclosed in U.S. Pat. No. 3,720,113 issued Mar. 13, 1972 and U.S. Pat. No. 4,080,841 issued Mar. 28, 1978. These patents are incorporated herein by reference.

By controlling the position of the pulleys, the operating pitch radius of an associated belt may be varied in a continuous manner without the step function changes noted above in connection with manual and automatic transmissions.

In an automotive environment in particular, space constraints often limit housing sizes, shaft center distances, pulley diameters, etc. Design parameters of this nature limit the ratio range of the belt/pulley system. Thus, there remains a need in the art to increase the ratio range of the belt/pulley system without increasing overall CVT size.

SUMMARY OF THE INVENTION

The primary object of this invention is to meet the need noted above. To that end, there is disclosed herein a CVT incorporating an input shaft on which a first variable pulley is mounted, an output shaft on which a second variable pulley is mounted, and a tension-type belt coupling the pulleys. The operating pitch radius of the belt is extended outwardly to such an extent that at least a portion of its bands extend outwardly beyond the pulley flange rims. The flange surfaces which form the pulley cones are beveled or chamfered at their outer ends to provide for smooth re-entry of the bands into the cones in the unlikely event that the bands drift laterally.

BRIEF DESCRIPTION OF THE DRAWING

The objects and advantages of this invention will become apparent to those skilled in the art upon careful consideration of the specification herein, including the drawing, wherein:

FIG. 1 is a sectional view of a typical belt/pulley system for use in a CVT;

FIG. 2 is an enlarged view of a portion of the system of FIG. 1 showing the prior art pulley configuration; and FIG. 3 is an enlarged view of a portion of the system of FIG. 1 showing details of the improved pulley configuration disclosed herein.

While this invention is susceptible of embodiment in many different forms, a preferred embodiment will be shown in the drawing and described in detail. It should be understood that the present disclosure is considered to be an exemplification of the principles of the invention, and is not intended to limit the invention to this embodiment.

DESCRIPTION OF THE ENVIRONMENT

Referring to the drawing in greater detail, a CVT 10 includes a tension-type belt/pulley system 12. An input shaft 14 is adapted to receive torque from, for example, an associated vehicle engine. An input pulley 16 is associated with shaft 14 and includes a fixed flange 18 rotatable with shaft 14 and a variable flange 20 rotatable with and axially slideable relative to shaft 14. A fluid chamber 22 is shown generally beside flange 20. It should be readily understood that the admission of fluid under pressure into chamber 22 will effect axial sliding movement of flange 22 toward flange 18, thereby increasing the operating pulley cone radius, and that withdrawal of fluid from chamber 22 will allow axial sliding movement of flange 20 away from flange 18, thereby decreasing the operating pulley cone radius.

An output shaft 24 is spaced from shaft 14 and directs torque to, for example, an associated gear set or the like within CVT 10. An output pulley 26 is associated with shaft 24 and includes a fixed flange 28 rotatable wth shaft 24 and a variable flange 30 rotatable with and axially slideable relative to shaft 24. A fluid chamber 32 is shown generally beside flange 30. Fluid under pressure in chamber 32 will bias flange 30 toward flange 28. Similarly, withdrawal of fluid will relieve this biasing force. A more complete disclosure of typical fluid control systems which may be used in conjunction with pulleys 16 and 26 is to be found in the aforementioned patents.

A tension-type belt 34 drivingly couples pulleys 16 and 26. Belt 34 includes a plurality of struts 36 which are guided by endless bands 38, preferably formed from a plurality of layered band elements. Torque is transferred between pulleys 16 and 26 by the compressive force of one strut 36 pressing against another. Bands 38 are in tension, and hold belt 34 together. A more complete disclosure of such an arrangement is described in detail in the aforementioned patents.

DESCRIPTION OF THE PRIOR ART

A typical prior art pulley configuration for a tension-type belt/pulley system is shown in FIG. 2. Pulley flange 18 (or 28) defines a substantially conical surface 40 and an outer rim surface 42. Similarly, pulley flange 20 (or 30) defines a substantially conical surface 44 and an outer rim surface 46. Surfaces 40 and 44 define an acute angle which is the pulley cone angle. Rim surfaces 42 and 46 define the maximum operating pulley cone radius 48.

Each strut 36 defines side surfaces 50 which preferably are oriented at the pulley cone angle. Strut 36 also defines crowns 52 on which inner surfaces 54 of bands 38 ride. Each surface 54 defines the inner operating radius of its associated band 38. As is well known in the art, bands 38 tend to ride at the highest point on crowns 52, thus reducing their tendency to drift laterally.

The outer operating radius of each band 38 is defined by its outer surface 56. In order to ensure that bands 38 are confined within the pulley cone, the prior art teaches that the maximum outer operating radius 56 of each band 38 should not be greater than the maximum pulley cone radius 48. This is for the purpose of limiting lateral drift of the bands at both pulleys and at all ratios. Pulley 16 and 26 together positively confine such lateral drift twice for each revolution of belt 34. As a result, the maximum operating pitch radius of belt 34, shown at 58 in FIG. 2, is considerably smaller than the maximum pulley cone radius 48.

DESCRIPTION OF THE IMPROVEMENT

With pulleys 16 and 26 in any position, at least one of them will always confine bands 38 positively within the pulley cone once during each belt revolution. For example, even when system 12 is in the maximum reduction mode shown in FIG. 1, pulley 16 positively confines bands 38 within the pulley cone.

It is known now that significant lateral drift of bands 38 is unlikely during a half revolution of belt 34. Thus, it is unnecessary to provide positive confinement of bands 38 twice per revolution. As a result, the maximum operating pitch radius 58 of belt 34 may be increased significantly, approaching the maximum operating pulley cone radius 48.

As shown in FIG. 3, flange 18 (or 28) defines a bevel or chamfer 60 at the outer extremity of conical surface 40. Similarly, flange 20 (or 30) defines a bevel or chamfer 62 at the outer extremity of conical surface 44. Surfaces 60 and 62 define a larger acute angle than do surfaces 40 and 44. The arrangement is such that in the maximum outward position of struts 36, outer band surfaces 56 are oriented outwardly of rim surfaces 42 and 46. Thus, the maximum operating outer band radius is greater than the maximum operating pulley cone radius. In the unlikely event of significant lateral drift of bands 38 during a half revolution of belt 34, they will be wedged inwardly by surfaces 60 and 62, providing smooth re-entry of the bands into the pulley cone during the next half revolution.

It is contemplated that inner band surfaces 54 also may be oriented outwardly of rim surfaces 42 and 46. Thus, the maximum operating inner band radius may be less than, substantially equal to, or greater than the maximum operating pulley cone radius, as desired.

EVALUATION OF THE IMPROVEMENT

The ratio range of a belt/pulley system is defined as the maximum reduction ratio with the pulleys in one extreme position divided by the maximum overdrive ratio with the pulleys in the other extreme position.

A comparison of the difference between the maximum operating belt pitch radius 58 relative to the maximum operating pulley cone radius 48, as illustrated in FIGS. 2 and 3, shows the attainment of a significant improvement in the ratio range of belt/pulley system 12. In one example, the use of pulleys having flange configurations of the type shown in FIG. 3 increased the ratio range about 9%, from approximately 4.94 to approximately 5.38. In a vehicle operating at 50 mph under steady state, road load conditions, this resulted in a fuel economy improvement of approximately 3%. Thus, a minor structural change in pulley configuration resulted in a significant improvement in fuel economy.

It is not intended that the present invention be restricted in its application to an automotive environment. It is contemplated that the invention will be utilized in a wide variety of applications in which it is desirable to incorporate a tension-type belt/pulley system.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. A tension-type belt/pulley system comprising a plurality of variable pulleys, and a tension-type belt coupling said pulleys, each pulley including surface means for gripping said belt in a torque-transferring relationship, said surface means defining the pulley-cone, rim means defining the maximum operating pulley cone radius, and bevel means joining the outer extremity of said surface means with said rim means, said belt including a plurality of struts, and endless band means guiding said struts, said band means having operating inner and outer radii, said system being constructed and arranged such that the maximum operating outer band radius is greater than the maximum operating pulley cone radius.

2. The system of claim 1, wherein the maximum operating inner band radius is smaller than the maximum operating pulley cone radius.

3. The system of claim 1, wherein the maximum operating inner band radius is approximately equal to the maximum operating pulley cone radius.

4. The system of claim 1, wherein the maximum operating inner band radius is greater than the maximum operating pulley cone radius.

5. The system of claim 1, 2, 3 or 4, wherein said bevel means guides said band means for smooth re-entry into the pulley cone in the event said band means drifts laterally.

6. The system of claim 1, 2, 3, or 4, wherein said belt has an operating pitch radius, said bevel means being oriented substantially outwardly of the maximum operating belt pitch radius, said bevel means guiding said band means for smooth re-entry into the pulley cone in the event said band means drifts laterally.

7. A variable pulley comprising a pair of spaced pulley flanges movable relatively between proximal and distal positions, said flanges having opposed surfaces defining substantially conical surface means for conjointly gripping an associated belt in a torque-transferring relationship, said flanges also defining outer rim surfaces and chamfers joining said conical surface means with said outer rim surfaces, said conical surface means together defining a pulley cone angle, and said chamfers together defining an angle larger than said pulley cone angle.

* * * * *